United States Patent
Goto

(10) Patent No.: US 7,190,488 B2
(45) Date of Patent: Mar. 13, 2007

(54) IMAGE FORMING APPARATUS AND METHOD

(75) Inventor: Osamu Goto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 965 days.

(21) Appl. No.: 10/242,753

(22) Filed: Sep. 13, 2002

(65) Prior Publication Data

US 2003/0174364 A1    Sep. 18, 2003

(30) Foreign Application Priority Data

Mar. 15, 2002    (JP)    .................... P. 2002-071830

(51) Int. Cl.
    *H04N 1/40*    (2006.01)
(52) U.S. Cl. ...................... 358/1.9; 358/527
(58) Field of Classification Search ................ 358/1.9, 358/2.1, 504, 406, 527
    See application file for complete search history.

(56) References Cited

U.S. PATENT DOCUMENTS

| | | | |
|---|---|---|---|
| 5,715,498 A | 2/1998 | Takeuchi et al. | ............... 399/40 |
| 6,236,827 B1 | 5/2001 | Hada | ........................... 399/301 |
| 6,529,616 B1 * | 3/2003 | Rasmussen et al. | ........ 382/112 |
| 6,554,387 B1 * | 4/2003 | Otsuki | .......................... 347/19 |
| 6,603,573 B1 * | 8/2003 | Adler et al. | ................. 358/1.9 |

FOREIGN PATENT DOCUMENTS

| | | |
|---|---|---|
| JP | 07-193722 | 7/1995 |
| JP | 8-85236 | 4/1996 |
| JP | 8-146317 | 6/1996 |
| JP | 8-218400 | 8/1996 |
| JP | 2749367 B | 2/1998 |
| JP | 10-294868 | 11/1998 |
| JP | 2000-101835 | 4/2000 |
| JP | 2000-112206 | 4/2000 |
| JP | 2001-309139 | 11/2001 |

* cited by examiner

*Primary Examiner*—Thomas D. Lee
*Assistant Examiner*—Stephen Brinich
(74) *Attorney, Agent, or Firm*—Morgan, Lewis & Bockius LLP

(57) ABSTRACT

An image data generation part 400 generates image data, attaches a tag to the image data, and then outputs the resultant data. A screen processing part 420 carries out a screen process on the image data in accordance with the characteristic indicated by the tag, and outputs the tag to a parameter generation part 428. The parameter generation part 428 adjusts a parameter of a correction process in an image processing part 424 so that a detected misregistration does not interfere with the screen characteristic. The image processing part 424 applies such a correction process as to cancel a detected misregistration in an output image to input image data in accordance with the parameter of the correction process as input. A print processing part 440 controls an apparatus main body 2 to cause it to print corrected image data.

10 Claims, 15 Drawing Sheets

PRINT STATE ON RECORDING SHEET (BELT)
(AFTER MISREGISTRATION CORRECTION)

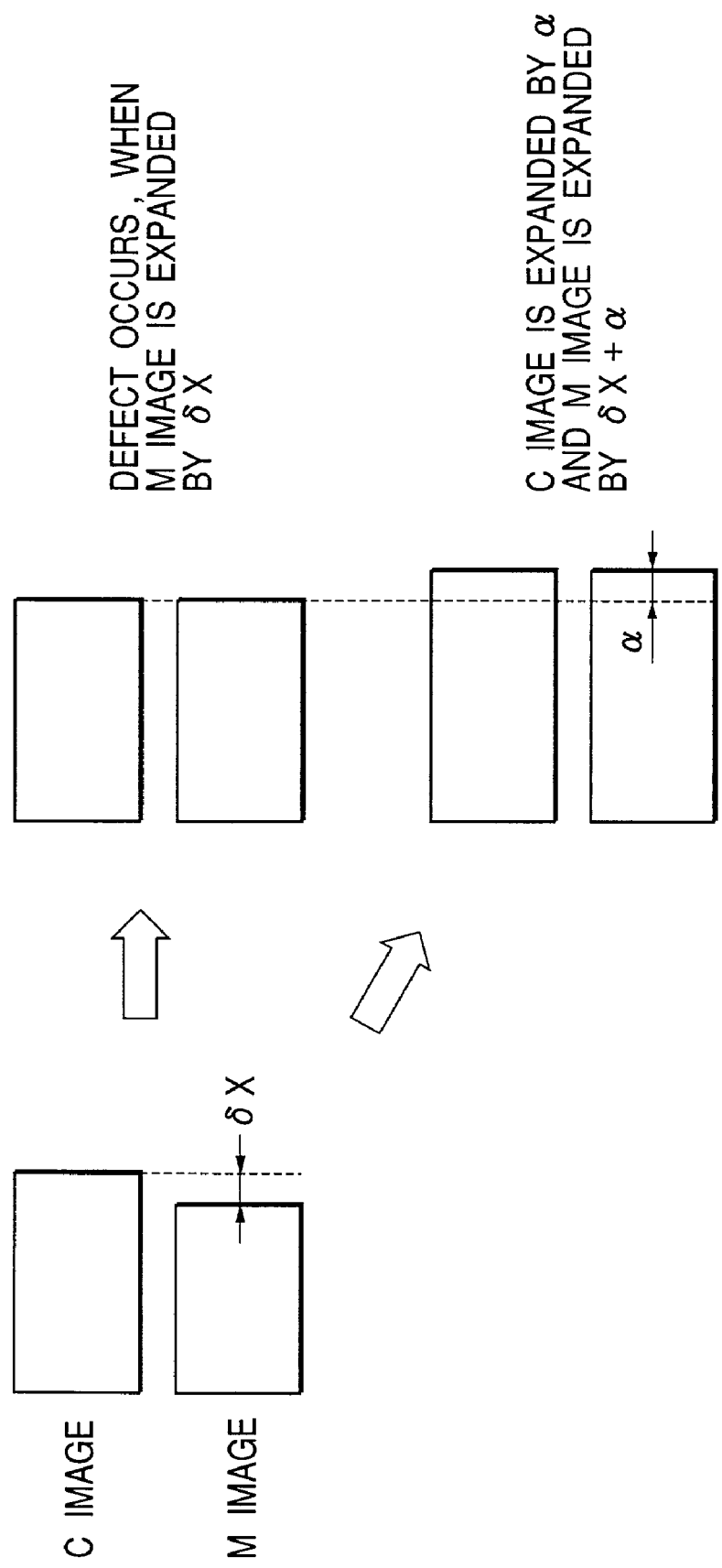

LINE SCREEN

CLUSTER DOT SCREEN

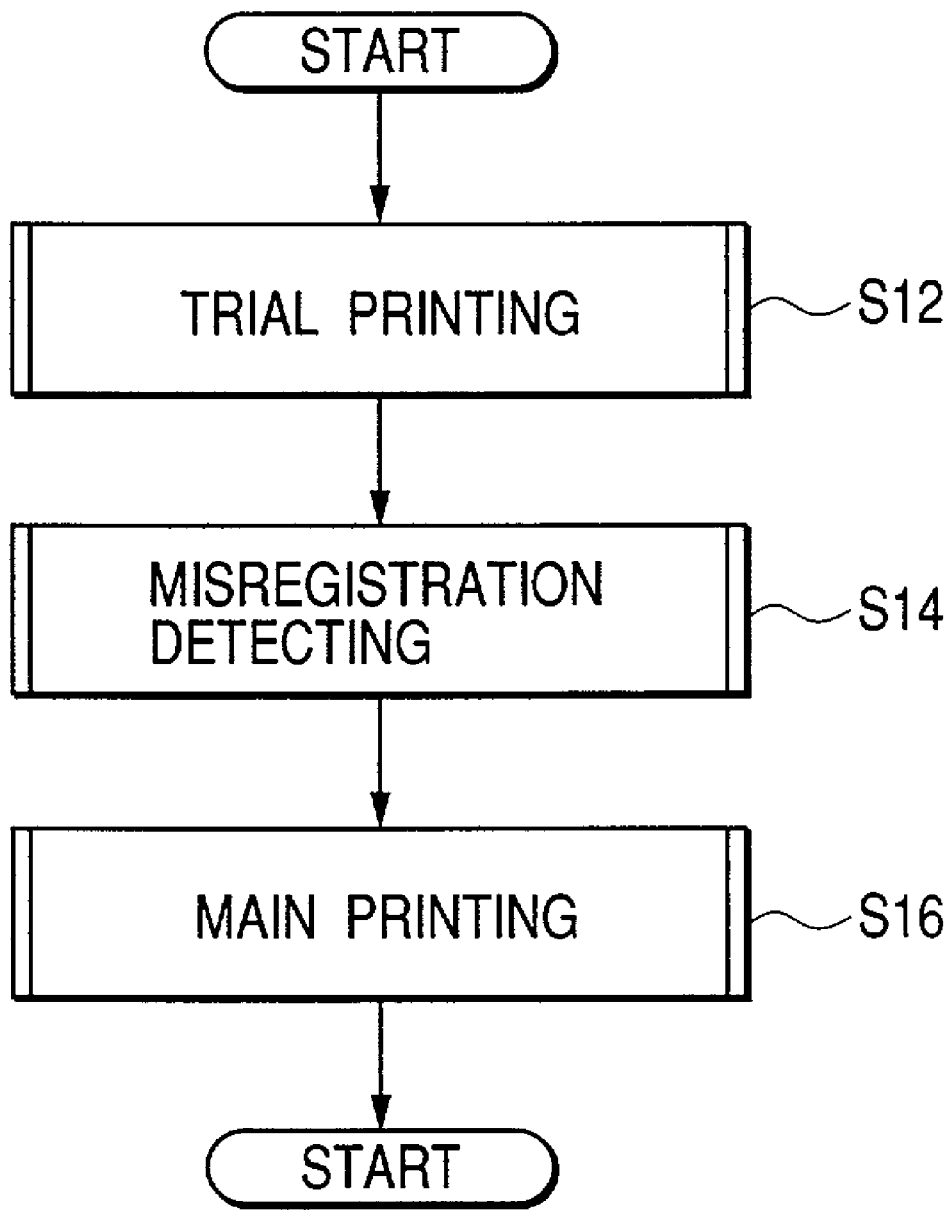

IMAGE FORMING APPARATUS AND METHOD

The present disclosure relates to the subject matter contained in Japanese Patent Application No. 2002-71830 filed on Mar. 15, 2002, which are incorporated herein by reference in its entirety.

BACKGROUND OF THE INVENTION

1. Field of the Invention

The present invention relates to an image forming apparatus and method which corrects distortion of an image, such as skew and bow, and magnification power, and then forms an image.

2. Description of the Related Art

When an image is formed (printed) by using a Xerography basis printer (image forming apparatus) or the like, distortion such as skew and bow, and misregistration such as variation of magnification power sometimes appear in an output image.

In JP-A-8-146317 (article 1), Japanese patent No. 2749367 (article 2) and the like, there is disclosed a method for correcting such a misregistration by changing an optical path of a light beam used for forming an image on a photo-receptor.

In JP-A-8-218400 (article 3) and the like, there is disclosed a method of correcting the magnification power by modifying a video clock used for forming an image on the photo-receptor.

In JP-A8-85236 (article 4) and JP-A-2000-112206 (article 5), there is disclosed in a method of correcting a color misregistration, which is caused in a color printing, by the image processing.

To realize the method as disclosed in the articles 1 to 3, it is necessary to provide a hardware component exclusively used for the correction in an optical system of the printer.

Accordingly, where the method disclosed in any of those articles is employed, the apparatus size is likely to be large, and cost problem is also likely to arise.

The skew correction mutually affects the bow correction. Accordingly, when one distortion is corrected, the other distortion further progresses.

On those corrections, there is a hardware performance limit, and accordingly, their accuracy and performance are always below the limit.

In a printer for printing by use of the screen, when the method of the article 4 or 5 is applied to the image having undergone the screen process, the pixels for the magnification correction interfere with the screen used for printing. Another misregistration, such as interference fringes, possibly appears in the output image.

When to avoid such an interference, the method is applied to the image before it is screen processed, a misregistration of the screen structure per se is left sometimes.

SUMMARY OF THE INVENTION

Accordingly, an object of the present invention is to provide an image forming apparatus and method which applies, for image formation, an image process to an image to thereby effectively eliminate a misregistration of the image.

According to a first aspect of the invention, there is provided an image forming apparatus having a misregistration detecting part for detecting a misregistration, a first image processing part for carrying out a first process on image data, a correcting part for carrying out a correction process on the image data having undergone the first process, on a basis of the misregistration detected by the detecting part, and an image forming part for forming an image of the image data having undergone the correction process.

According to a second aspect of the invention, the image forming part forms a multi-color image from image data of a plurality of colors, the first image processing part carries out the first image process on each color image data, and the correction part individually carries out the correction process on the plurality of color image data having undergone the first image process.

According to a third aspect of the invention, the first image processing part is a screen processing part.

According to a fourth aspect of the invention, the correction process is carried out based on a predetermined parameter. The correction processing part includes a parameter determination part for determining the predetermined parameter to remove defects of an image, which is formed by correcting image data having been screen processed on the basis of characteristic of the screen process, and a second image processing part for correcting the screen processed image data by using the determined predetermined parameter.

According to a fifth aspect of the invention, the characteristic of the screen process indicates a periodicity of the screen process, the correction process parameter is relevant to a periodicity of the correction process, and the parameter determination part determines the predetermined parameter to prevent interference of the period of the screen process with the period of the correction process.

According to a sixth aspect of the invention, the predetermined parameter is determined on the basis of at least one of number of lines in the screen process, screen angle and reproduction density, and the parameter of the correction process includes at least one of inserting of pixels into the image data screen processed and thinning out of pixels from the image data screen processed.

According to a seventh aspect of the invention, the parameter determination part determines the parameter so that at least one of period of inserting of pixels into the image data screen processed and period thinning out of pixels from the image data screen processed is different from at least one of period of number of lines in the screen process, period of screen angle and period of reproduction density.

BRIEF DESCRIPTION OF THE DRAWINGS

FIG. 10 is a diagram showing a correction of a misregistration caused when the configurations of both-side printed images are coincident with each other.

FIG. 12 (A) shows an output image formed in a manner that the image data is screen processed, and printed while not correction-processed.

FIG. 16 is a flow chart showing the image forming program of FIG. 15.

DETAILED DESCRIPTION OF THE PREFERRED EMBODIMENTS

The preferred embodiments of the present invention will be described with reference to the accompanying drawings.

<Outline of the Invention>

Figure 1:
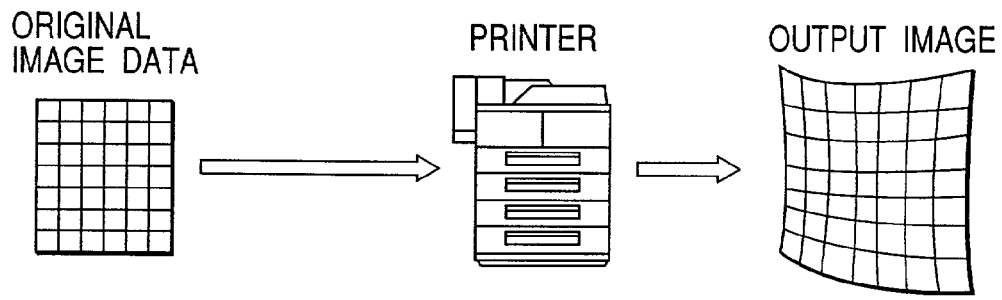
FIG. 1 is a diagram exemplarily showing a printer which color prints an image without misregistration correction.

FIG. 1 is a diagram exemplarily showing a printer which color prints an image without misregistration correction.

Figure 2:
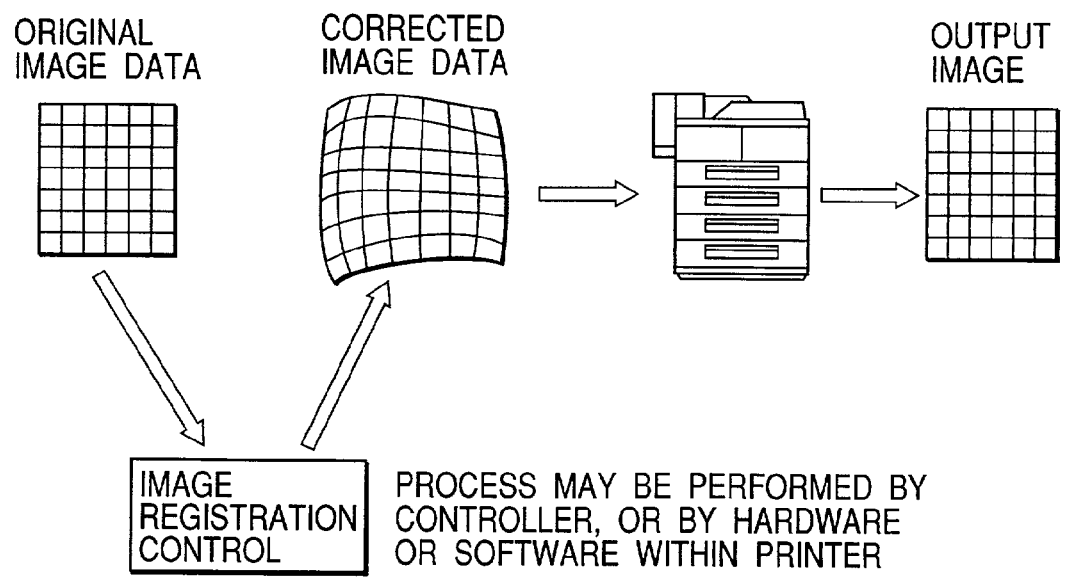
FIG. 2 is a diagram exemplarily showing a printer which color prints an image after the misregistration correction.

FIG. 2 is a diagram exemplarily showing a printer which color prints an image after the misregistration correction.

As shown in FIG. 1, a printer is used which prints using a plurality of photo receptors, for attaching toner particles of different colors onto a recording sheet. Misregistration called skew and bow often appears in the output image printed by the printer.

A solution to the problem shown in FIG. 1 is presented. As shown in FIG. 2, for example, prediction is made as to what type of misregistration appears in an output image. A deformation which is reverse phase with respect to the misregistration is caused in advance in the image data so as to cancel the misregistration. And then, the image data is printed.

FIGS. 3 to 6 are first to four diagrams exemplarily showing a full-magnification correction in the main scan direction.

A specific example of the full-magnification correction in the main scan direction will be described in more detail.

Figure 3:
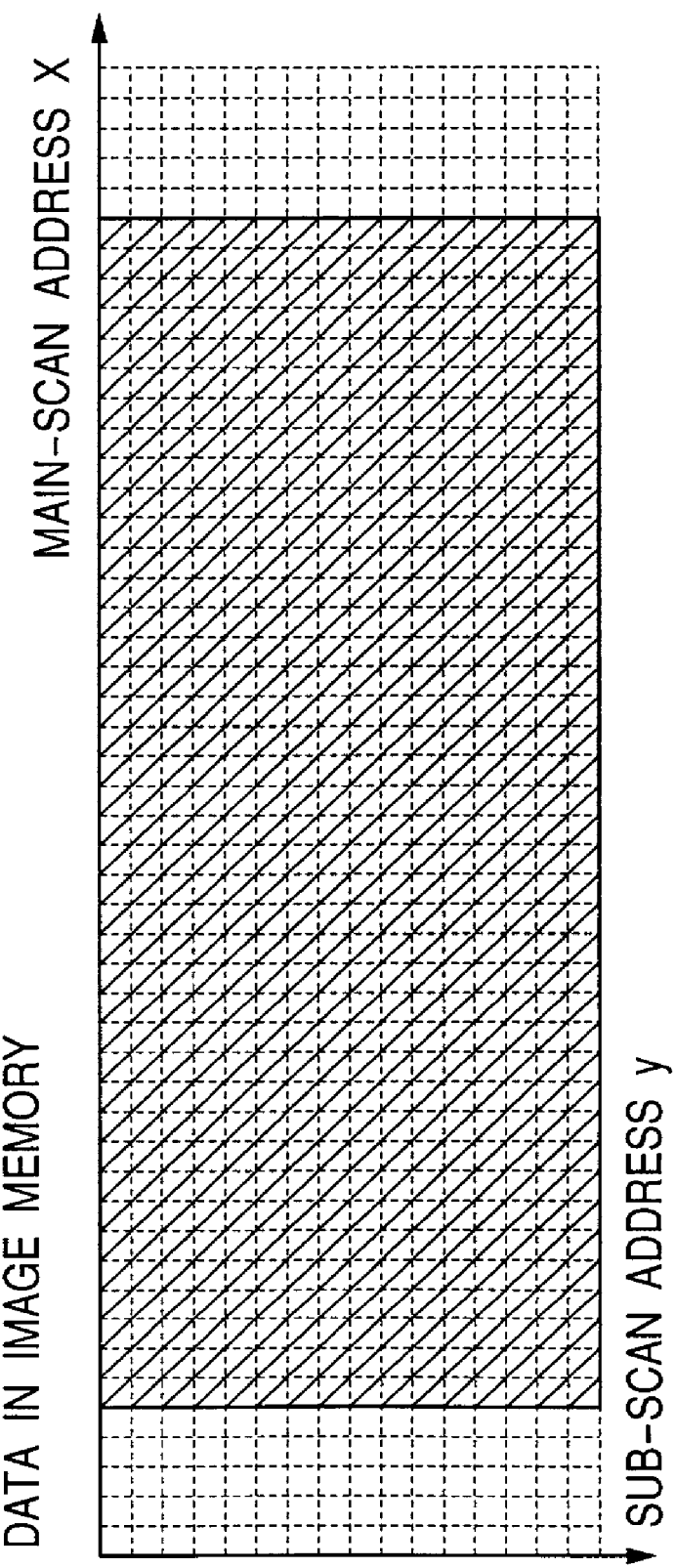
FIG. 3 is a first diagram exemplarily showing a full-magnification correction in the main scan direction.
Figure 4:
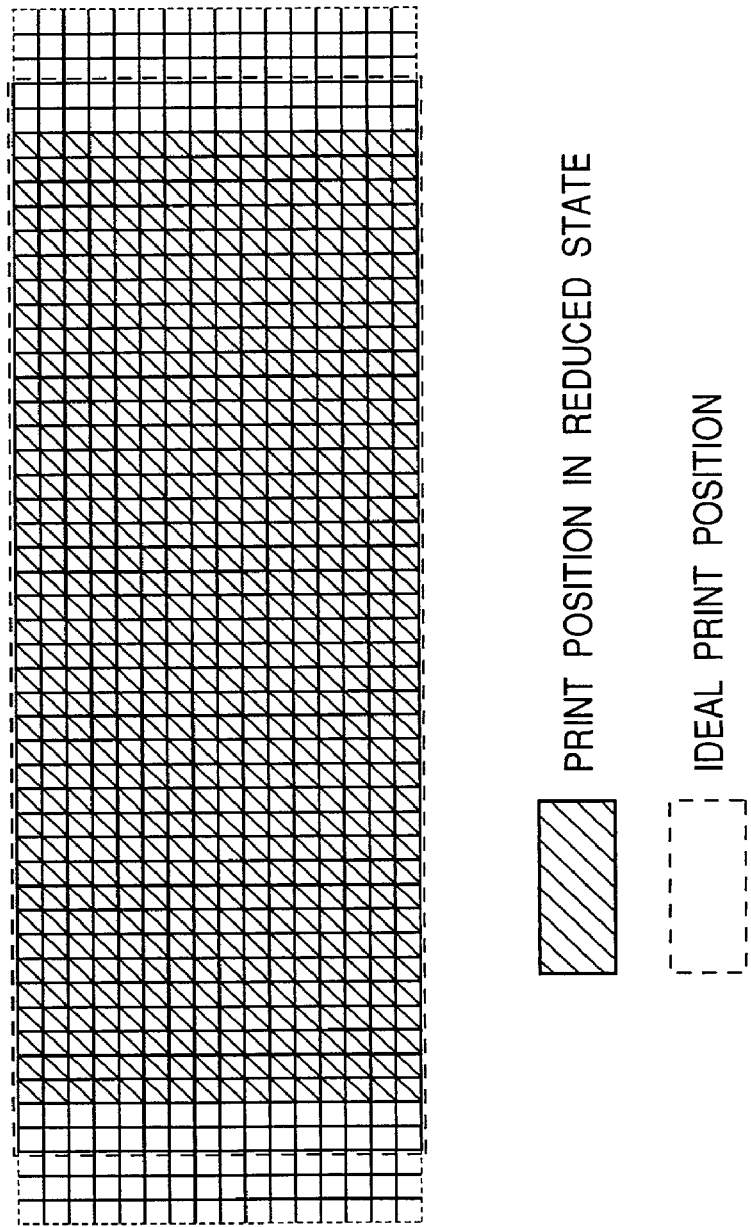
FIG. 4 is a second diagram exemplarily showing a full-magnification correction in the main scan direction.

As shown in FIGS. 3 and 4, when the image data is printed without correction, such a misregistration appears that the width of the output image in the main scan direction is shorter than a target print width.

To solve such a misregistration, how the output image is reduced in size is detected, and the coordinates (correction coordinates) to insert the correction data into the image data on the memory is computed.

Figure 5:
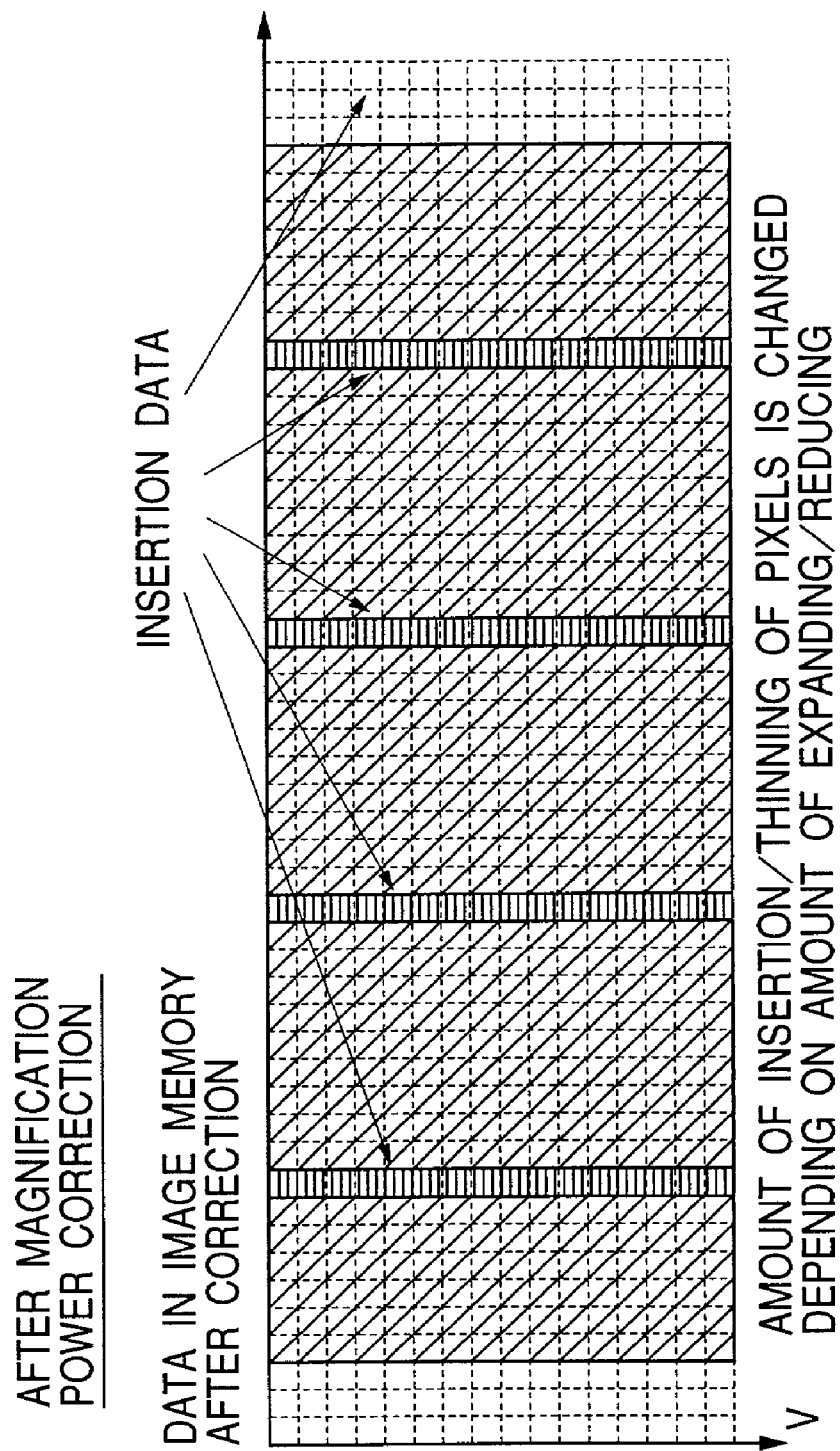
FIG. 5 is a third diagram exemplarily showing a full-magnification correction in the main scan direction.

Further, as shown in FIG. 5, by controlling the addresses which are used for reading out image data from the memory, data is insert into the correction coordinates thus computed and a correction which is reverse phase with respect to the misregistration (the correction will be referred to as "reverse phase correction") is performed to expand the image data in the main scan direction.

Figure 6:
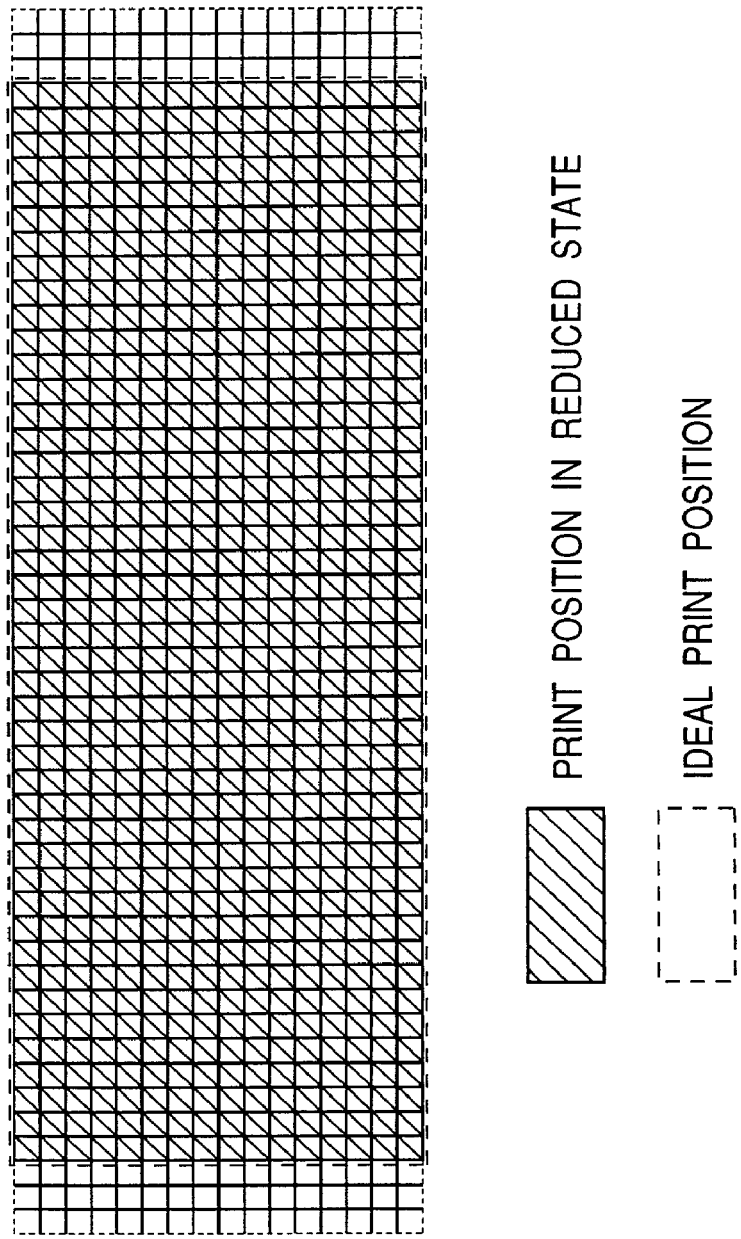
FIG. 6 is a fourth diagram exemplarily showing a full-magnification correction in the main scan direction.

The image data thus having undergone the reverse phase correction, when printed, has the target print width since the misregistration is cancelled, as shown in FIG. 6.

In the opposite case where the output image suffers from a misregistration expanding in the main scan direction, what a designer has to do is to thin data at appropriate intervals and to reduce the image data in the main scan direction.

Figure 7:
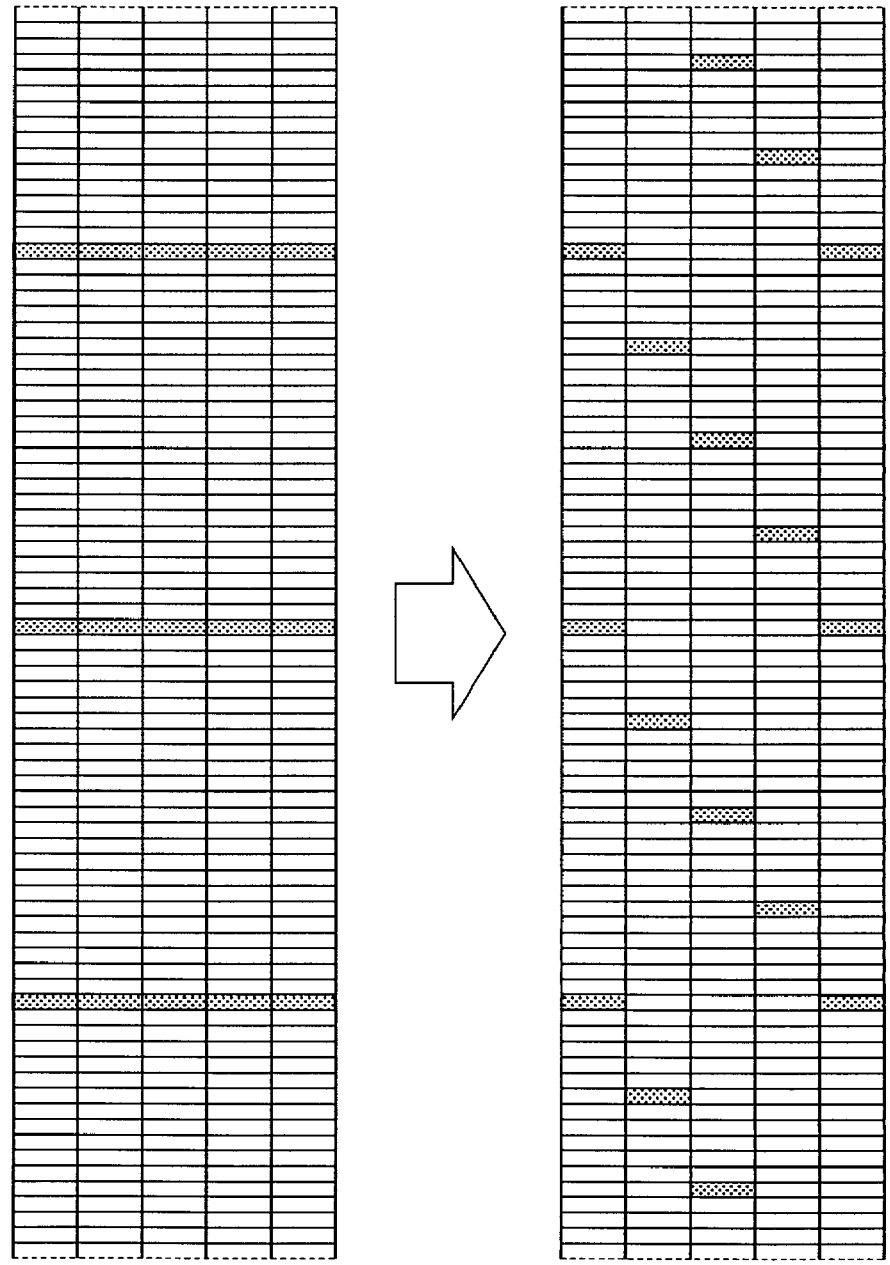
FIG. 7 is a diagram showing positions of image data at which data is inserted and thinned out.

FIG. 7 is a diagram showing positions of image data at which data is inserted and thinned out.

However, if data is simply inserted into the same positions on the same main scan line as shown in the upper side of FIGS. 5 and 7, the inserted data is visually noticeable.

In such a simple data insertion where data is inserted into the image data at the same positions on the same main scan line, the following problem arises when a thin line is overlaid at the thin-out position: the thin line disappears and the amount of information of the image is remarkably reduced.

To solve such a problem, in an actual correction process data inserting/thinning out positions are changed as shown in the lower side of FIG. 7 or randomly to thereby scatter the data inserting/thinning out positions.

Figure 8:
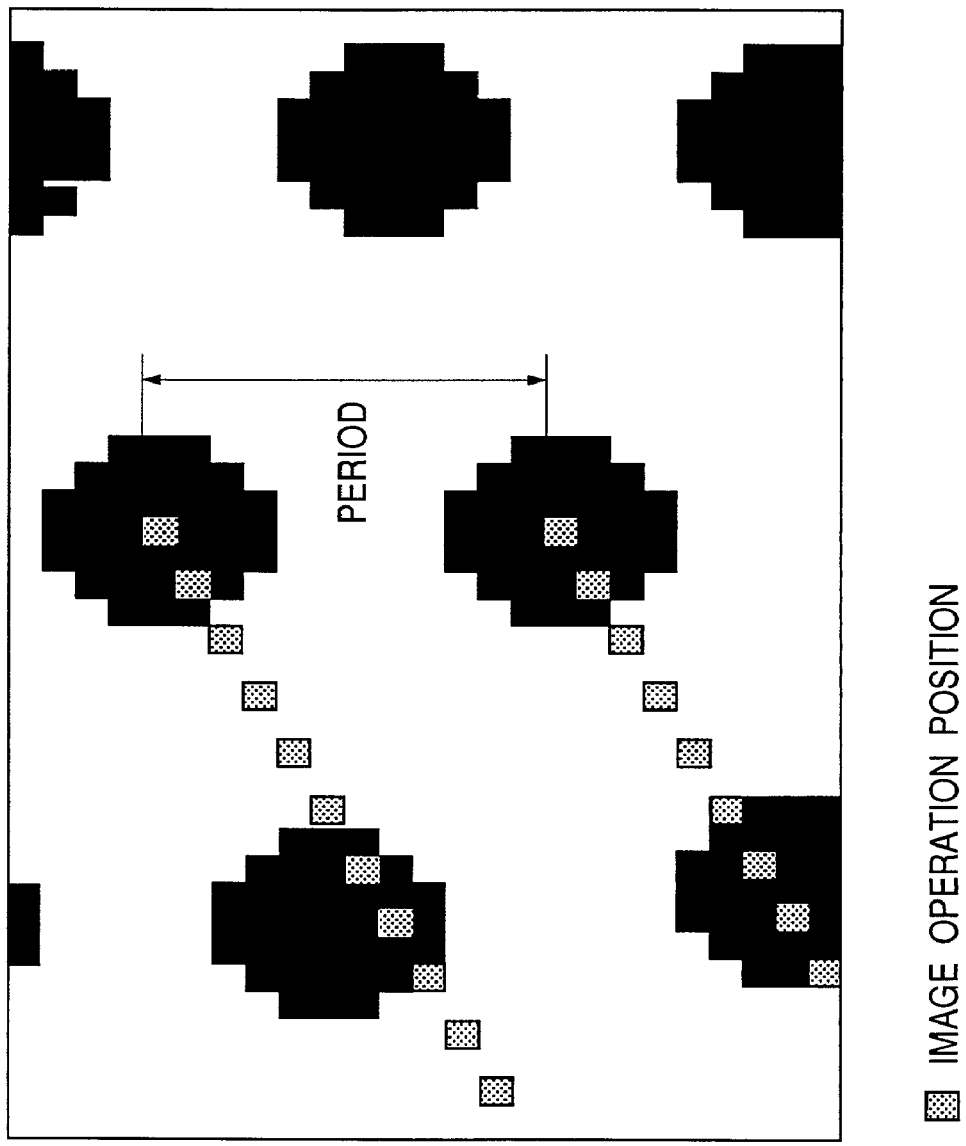
FIG. 8 is a diagram exemplarily showing an interference of the screen pitch with the data operation position.

FIG. 8 is a diagram exemplarily showing an interference of the screen pitch with the data operation position.

Figure 9:
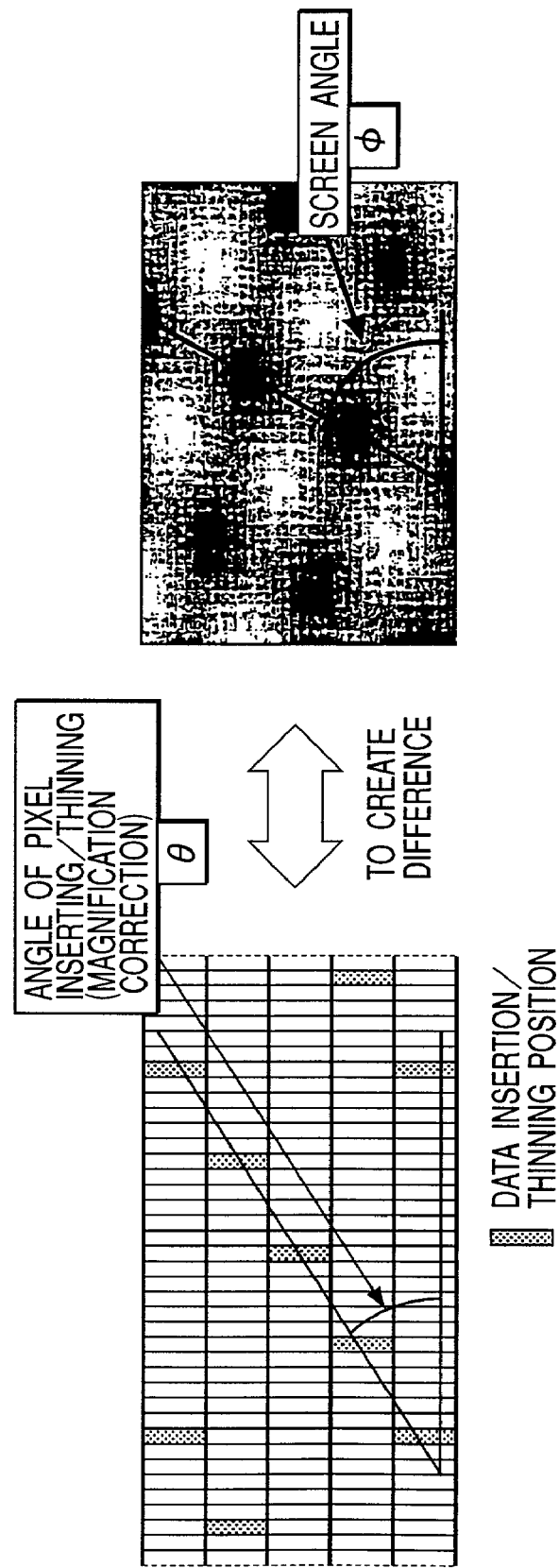
FIG. 9 is a diagram showing a relationship between the screen angle and the data operation position, which is selected so as to prevent the inserted data from being visually noticeable.

FIG. 9 is a diagram showing a relationship between the screen angle and the data operation position, which is selected so as to prevent the inserted data from being visually noticeable.

FIG. 10 is a diagram showing a correction of a misregistration caused when the configurations of both-side printed images are coincident with each other.

Figure 11B:
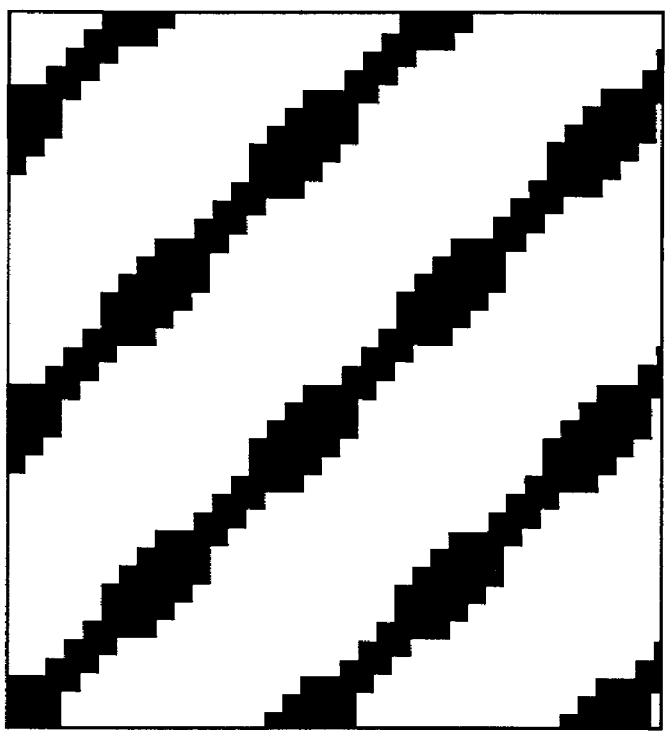
FIG. 11 is a diagram showing a form of reproduction density which depends on a kind of screen processing.
Figure 11A:
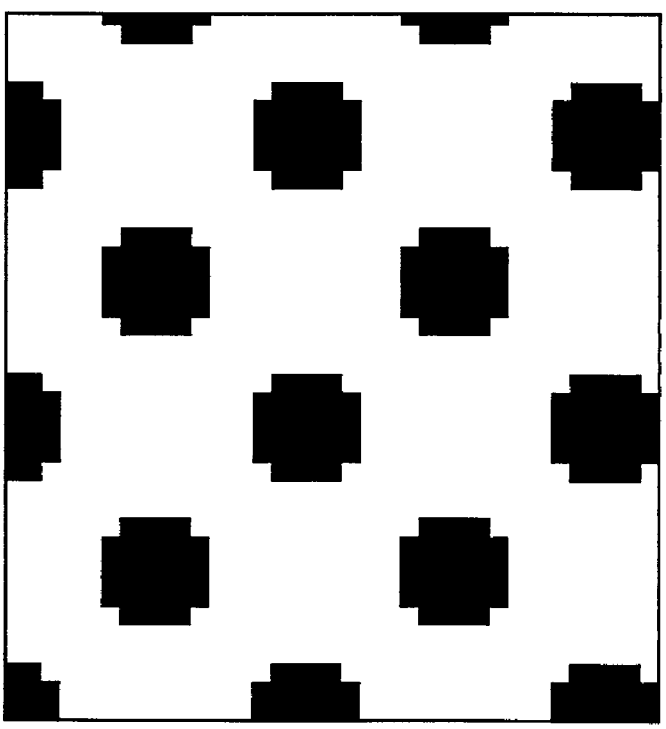

FIG. 11 is a diagram showing a form of reproduction density which depends on a kind of screen processing.

In most of general printers as illustrated in FIGS. 1 and 2, the image gradation is artificially broadened by the screen processing.

The screen process has characteristics, such as screen pitch, screen angle and reproduction density (density reproduced on the recording sheet). Those characteristics frequently cause a periodicity in the image.

The same density takes a quite different form depending on a kind of the screen, as shown in FIG. 11. A different screen process sometimes is used depending on the density. The characteristic of the screen process varies depending on the reproduction density, and it is visually noticeable.

As shown in FIG. 8, when the screen pitch is equal or substantially equal to the data inserting/thinning interval, those interfere with each other. In this case, the operation to correct the misregistration is visually noticeable sometimes.

To solve such a problem, the parameter of the correction process is adjusted so that the screen pitch is not equal to the data inserting/thinning interval.

If the screen angle is coincident or substantially coincident with the data inserting/thinning position, those interfere with each other and the misregistration is visually noticeable. Such interference may be avoided when, as shown in FIG. 9, the parameter used for the correction process is adjusted so as to produce a difference between the data inserting/thinning angle and the screen angle.

There is a case where the reproduction density changes the screen characteristic. In this case, it is necessary to avoid the interference by changing the parameter for the correction process in accordance with the reproduction density.

FIG. 10 is a diagram showing a method of correcting a misregistration caused for each color in a multi-color printing.

When the multi-color printing is performed by using the printer shown in FIG. 1, there is a case where an output image (C image) of cyan is expanded or reduced in size by δX with respect to an output image (M image) of magenta.

When, the magenta output image is expanded or reduced by δX so as to be matched in size to the cyan image in order to solve this problem, then the spatial frequency of the image is varied as shown in the right upper side of FIG. 10. A misregistration due to the correction process may appear in the magenta output image.

In such a case, as shown in the right under side of FIG. 10, for example, the misregistration may be corrected by changing an absolute correction amount so that those images have each a predetermined size, not using the relative correction process that the magenta image is made equal in size to the cyan image.

That is, the misregistration may be prevented by executing such a correction process that the cyan image is expanded or reduced in size by α without changing the relative position relationship, and the magenta image is expanded or reduced by δX+α.

As described above, to change the parameter of the correction process depending on the screen characteristic, the information on the characteristic of the screen is required for the correction process side.

When the screen characteristic is a known value as measured in advance, and has been set for the correction process, the parameter of the correction process may be determined depending on the screen characteristic as set.

When the screen characteristic is not set for the correction process, the screen characteristic necessary for the correction process side may be obtained by detecting the screen characteristic from the image data screen processed, by attaching a tag representing the screen characteristic to the image data in advance, or by obtaining it from a host computer (not shown) connected to the printer when it is required.

Figure 12A:
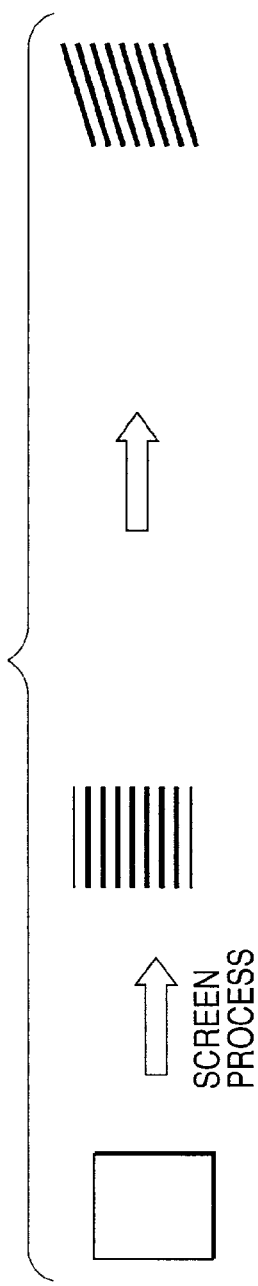
FIG. 12 exemplarily shows an order of executing the screen process and the correction process.
FIG. 12(B) shows an output image formed in a manner that the image data is screen processed, correction (image) processed, and then is printed.
FIG. 12(C) shows an output image formed in a manner that the image data is correction (image) processed, screen processed, and then is printed.
Figure 12B:
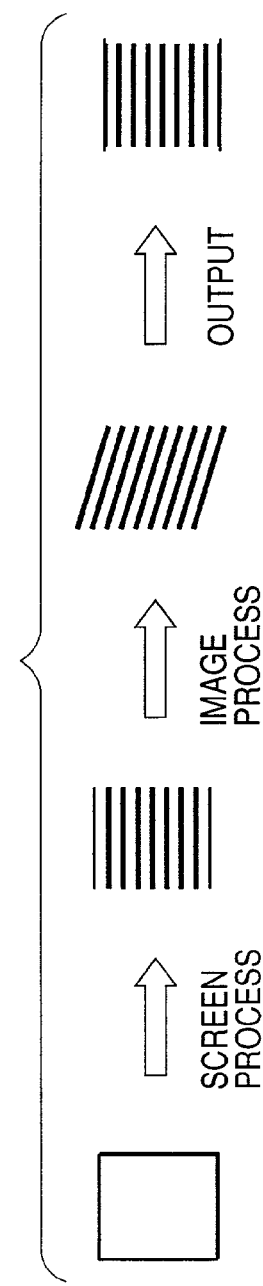
Figure 12C:
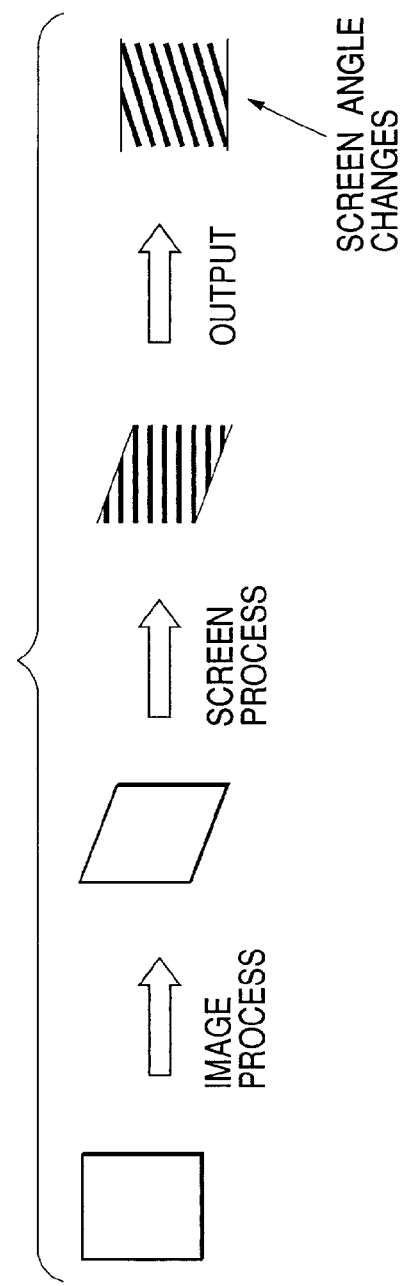

FIG. 12 exemplarily shows an order of executing the screen process and the correction process. FIG. 12(A) shows an output image formed in a manner that the image data is screen processed, and printed while not correction processed. FIG. 12(B) shows an output image formed in a manner that the image data is screen processed, correction (image) processed, and then is printed. FIG. 12(C) shows an output image formed in a manner that the image data is correction (image) processed, screen processed, and then is printed.

As described above, a misregistration, such as skew, often appears in the output image which is formed in a manner that the image data is screen processed and printed while not correction processed, as shown in FIG. 12(A).

In the output image formed in a manner that the image data is corrected, screen processed, and is printed as shown in FIG. 12(C), the interference of the correction process with the screen is lessened since the screen structure is not deformed.

In the FIG. 12(C) case, however, offsets of the screen structure per se are not corrected. Accordingly, the screen angle changes and hence a misregistration may be left in the output image.

In the correction by the image processing, a change, which is minute when taken as a whole, is repeatedly applied to the image. In such a minute structure as the screen structure, even this minute change will give the screen structure a considerable change. Such changes often appear at some intervals.

A resolution (e.g., 600 dpi, 8-bit contone) of the image before screen processed is lower than a resolution (2400 dpi, 1-bit binary (bin)) of the image after it is screen processed. Accordingly, it is unfitted for the correction process every pixel.

For this reason, the most suitable correction process executing order is that the correction process follows the screen process, as shown in FIG. 12(B).

EXAMPLES

Examples of the invention will be described.

Figure 13:
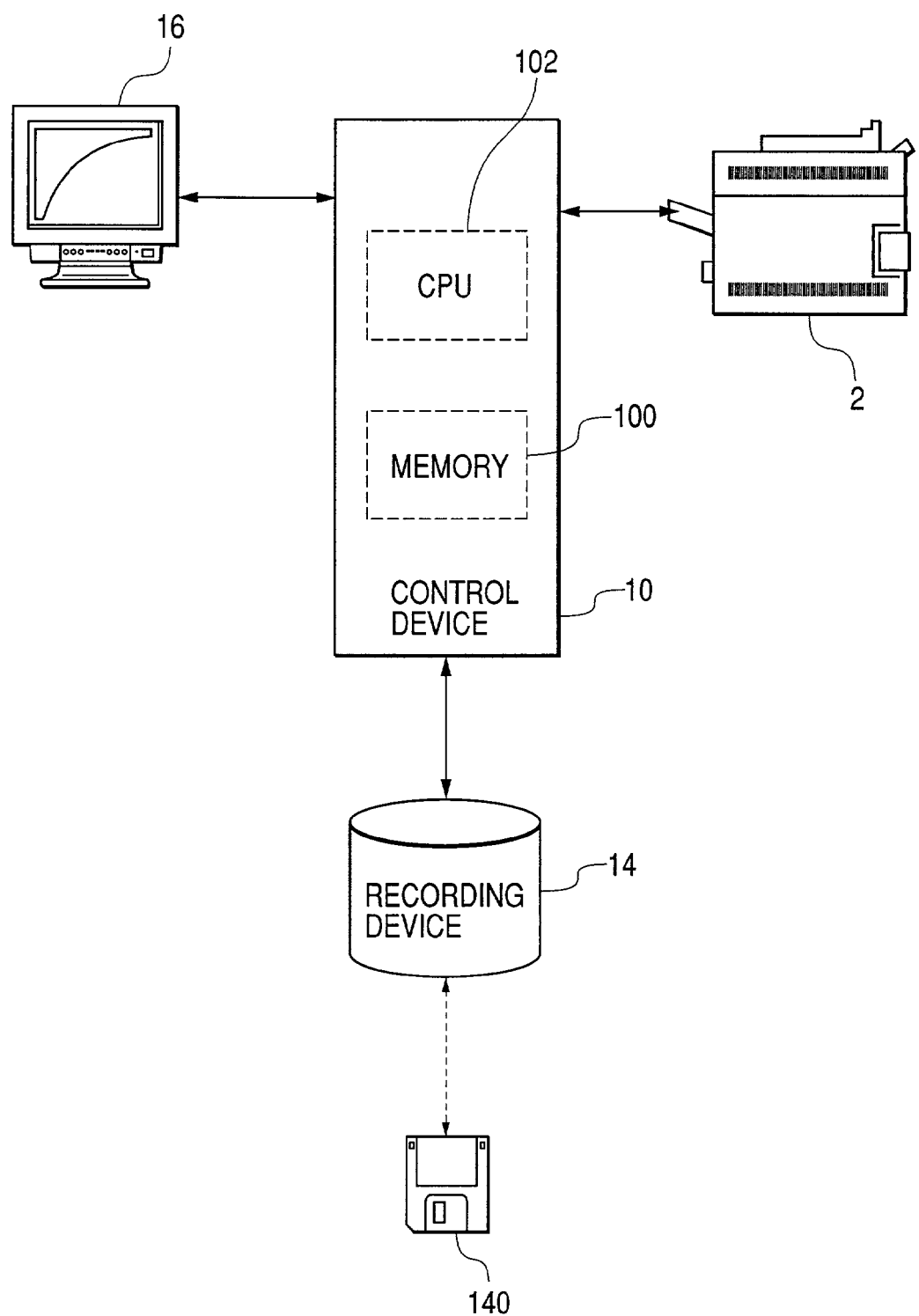
FIG. 13 is a diagram showing a printer apparatus into which an image forming method of the invention is incorporated.

FIG. 13 is a diagram showing a configuration of a printer apparatus 1, which carries out an image forming method of the invention.

Figure 14:
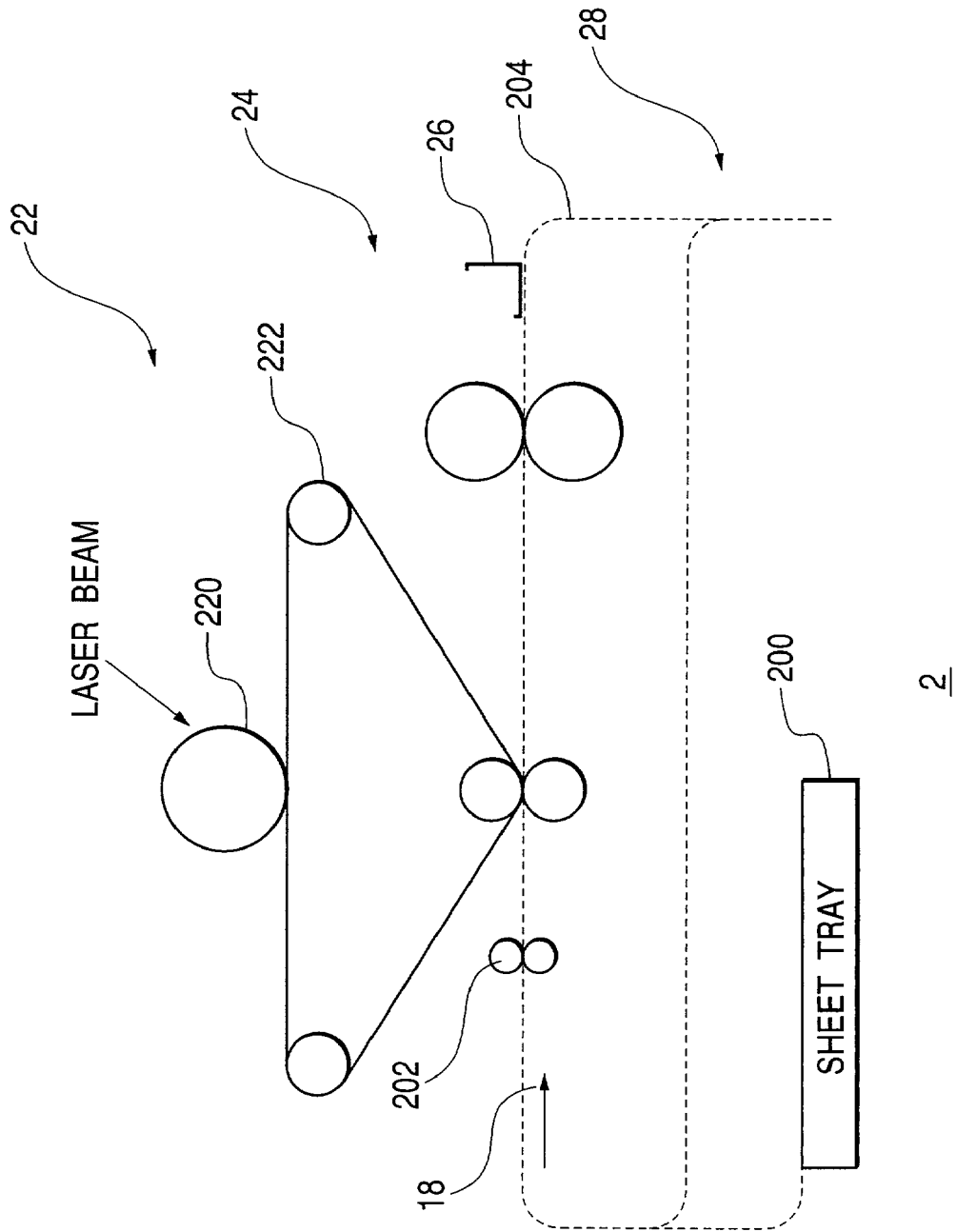
FIG. 14 is a diagram schematically showing an internal configuration of a printer apparatus shown in FIG. 13.

FIG. 14 is a diagram exemplarily showing an arrangement of an apparatus main body 2 shown in FIG. 13.

In FIG. 14, unlike FIGS. 1 and 2, only one image transfer part of the apparatus main body 2 is typically illustrated for the simplicity, and the remaining portions are omitted.

As shown in FIG. 13, the printer apparatus 1 includes the apparatus main body 2, a control device 10 containing a memory 100, a CPU 102 and the like, a recording device 14 such as a HDD or a CD-ROM, and a display/input device 16.

As shown in FIG. 14, the apparatus main body 2 includes a sheet tray 200, register roller 202, sheet transporting path 204, a plurality of image transfer parts 22 each containing a photo-receptor 220, intermediate transfer member 222 and the like, fixing device 24, scanner 26, and a sheet reversing device 28.

The printer apparatus 1 contains the functional components necessary for a general printer capable of multi-color printing.

Figure 15:
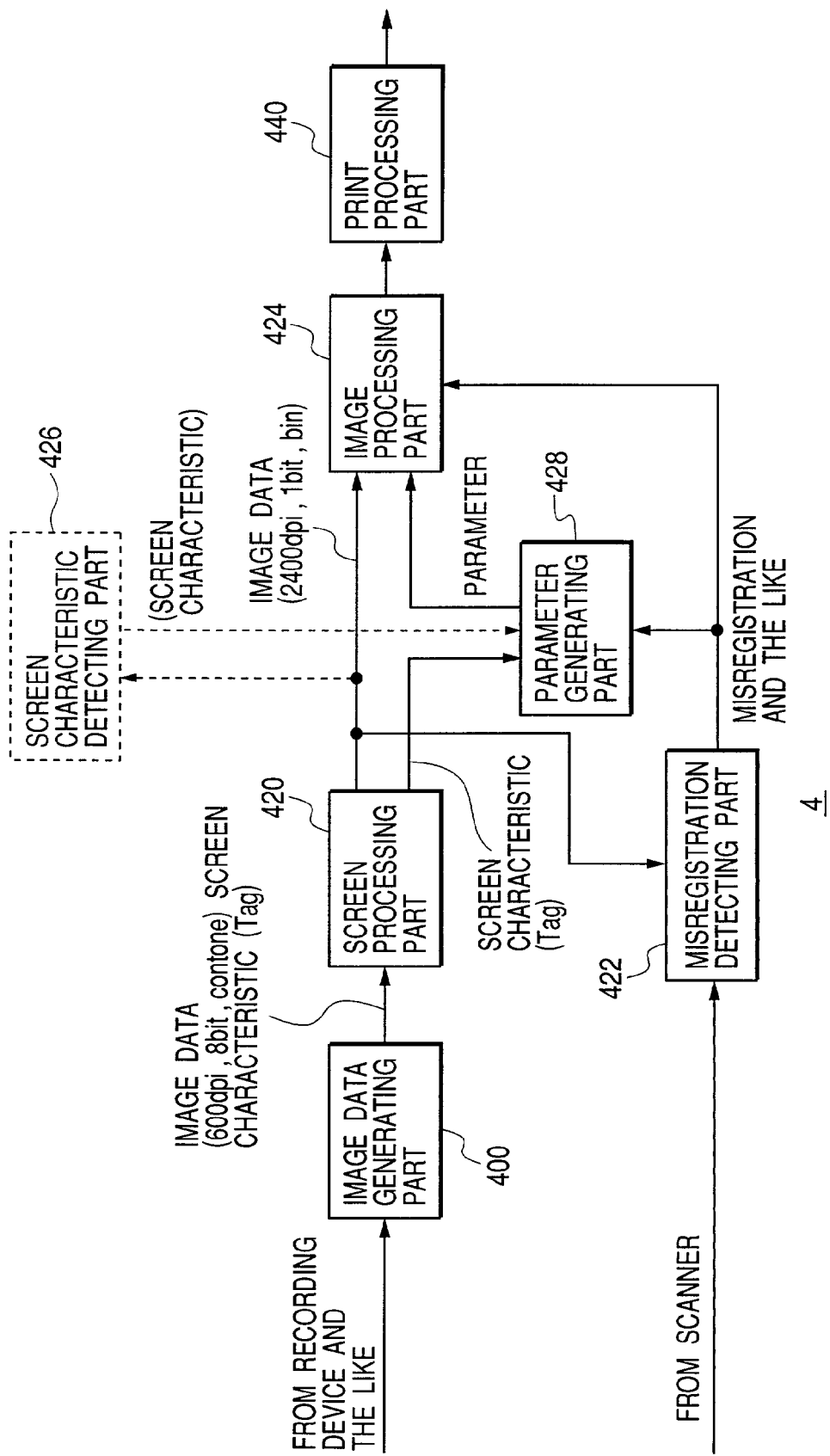
FIG. 15 is a block diagram showing a configuration of an image forming program for executing an image forming method according to the invention.

FIG. 15 is a block diagram showing an image forming program 4 for executing the image forming method of the invention.

As shown in FIG. 15, the image forming program 4 includes an image data generating part 400, screen processing part 420, misregistration detecting part 422, image processing part 424, parameter generating part 428, and a print processing part 440, and if required, further includes a screen characteristic detecting part 426 which will be described as a modification.

The image forming program 4, for example, is supplied to the recording device 14 of the printer apparatus 1 shown in FIG. 13 via a recording medium 140. The image forming program 4 is then loaded into the memory 100 of the control device 10, and is executed.

The image forming program 4 corrects an image, by those components, so as to cancel such misregistration as skew which will appear in an output image when no correction is carried out, and prints the image.

The components of the image forming program 4 are formed as program modules for each function. Those program modules may be added to or deleted from the program independently.

Those program modules may be started or stopped at desired timings.

The image data generating part 400 generates image data responsive to user's operations on the display/input device 16, or stores image data as supplied from the recording device 14.

The image data generating part 400 outputs the generated or stored image data as image data of 600 dpi, 8-bit and contone to the screen processing part 420 and the misregistration detecting part 422.

In the image data generating part 400, data representing the characteristics of the screen process (screen pitch and angle, reproduction density and the like), which is carried out in the screen processing part 420, is attached as a tag to the image data, and is output to the screen processing part 420.

The screen processing part 420 screen processes the image data received from the image data generating part 400 in accordance with the characteristics indicated by the tag attached to the image data, generates image data of 2400 dpi, 1-bit binary (bin), and outputs it to the image processing part 424.

The screen processing part 420 outputs the tag received from the image data generating part 400 to the parameter generating part 428.

The misregistration detecting part 422 compares test pattern image data (e.g., a lattice pattern) which is printed by the apparatus main body 2 without being correction processed, and is read out by the scanner 26 in advance, with original image data of a test pattern as input from the image data generating part 400. Through the comparison, the misregistration detecting part 422 detects distortion such as skew and bow, and misregistration such as magnification power variation, which, will appear in the output image when no correction is carried out.

The misregistration detecting part 422 outputs the detected misregistration of the output image to the image processing part 424 and the parameter generating part 428.

The image processing part 424 carries out the correction process on the image data received from the screen processing part 420 to cancel a misregistration of the output image detected by the misregistration detecting part 422 in accordance with a parameter of the correction process inputted from the screen processing part 420. The image data thus corrected is output to the print processing part 440.

The parameter generating part 428 adjusts the value of the parameter of the correction process so that the correction process for canceling the misregistration detected by the misregistration detecting part 422 and the screen process characteristics represented by the tag input from the screen processing part 420 have not an affect, e.g., interference, on the output image, and generates a parameter of the correction process, which is performed in the image processing part 424, and outputs the parameter to the image processing part 424.

The print processing part 440 controls the related components of the apparatus main body 2 (shown in FIGS. 13 and 14) to thereby print the image data corrected by the image processing part 424 on a recording sheet 18.

An overall operation of the apparatus main body 2 will be described with reference to a flow chart (FIG. 16), which diagrammatically shows a, process (S10) carried out in the apparatus main body 2.

To start, a trial printing is carried out to detect misregistration which will appear in an output image, through user's operations on the display/input device 16 (S12, FIG. 16).

Image data of a test pattern, e.g., a lattice pattern, is supplied to the image data generation part 400, from the recording device 14.

The image data generating part 400 outputs original image data of the test pattern to the misregistration detecting part 422, adds the tag to the original image data of the test pattern, and outputs the resultant data to the screen processing part 420.

The screen processing part 420 screen processes the test pattern image data in accordance with the characteristics represented by the tag which is added to the image data, and outputs the processed data to the image processing part 424.

The image processing part 424 outputs the image data as input from the screen processing part 420 to the print processing part 440, while not the correction process on the image data.

The print processing part 440 controls the related components of the apparatus main body 2 (FIGS. 13 and 14) to cause it to print the test pattern image on the recording sheet 18.

The test pattern image fixed in the fixing device 24 is read out by the scanner 26, and is output to the misregistration detecting part 422.

The misregistration detecting part 422 detects misregistration such as skew which will appear in the output image on the basis of the image data input from the screen processing part 420 and the image data of the output image as input from the scanner 26, and outputs the detected misregistration to the parameter generating part 428 and the image processing part 424 (S14).

In turn, responding to the user's operation to the display/input device 16, a main printing is performed.

The image data generating part 400 generates image data to be used for the main printing, attaches the tag to the image data, and outputs the resultant data to the screen processing part 420.

The screen processing part 420 screen processes the image data in accordance with the characteristics represented by the tag, and outputs the processed data to the image processing part 424.

The screen processing part 420 outputs the tag to the parameter generating part 428.

The parameter generation part 428 adjusts the parameter of the correction process which is used in the image processing part 424 so as to prevent, for example, the interference of the detected misregistration with the screen characteristic, and outputs the adjusted one to the image processing part 424.

The image processing part 424 carries out a correction process on the input image data in accordance with the parameter of the correction process as input to thereby cancel the detected misregistration of the output image, and outputs the corrected image data to the print processing part 440.

The print processing part 440 controls the apparatus main body 2 (FIGS. 13 and 14) to cause it to print the corrected image data.

Modifications

When the image data generation part 400 does not attach the tag to the image data, or when the screen processing part 420 is different from the copying machine main body 2 and the screen characteristic is unknown, what a designer has to do is to add a screen characteristics detecting part 426 to the image forming program 4.

Specifically, the screen characteristics detecting part 426 detects the characteristics, such as screen pitch and screen angle, from the screen processed image data. The parameter generation part 428 generates a parameter using the characteristics detected by the screen characteristics detecting part 426.

When the misregistration of the output image is detected by other device (not shown) than the scanner 26, the misregistration detecting part 422 may be omitted.

The misregistration may also be detected in a manner that a patch is formed on the transfer belt, and read out by a sensor.

As seen from the foregoing description, an image forming apparatus and method according to the present invention applies, for image formation, an image process to an image to thereby effectively eliminate a misregistration of the image.

What is claimed is:

1. An image forming apparatus comprising:
    a misregistration detecting part that detects a misregistration of the image forming apparatus;
    a first image processing part that carries out a screen process on image data;
    a correcting part that carries out a correction process on the screen processed image data, on a basis of the misregistration detected by the detecting part; and
    an image forming part that forms an image of the corrected image data.

2. The image forming apparatus according to claim 1,
    wherein the image forming part forms a multi-color image from image data of a plurality of colors;
    wherein the first image processing part carries out the screen process on each color image data; and
    wherein the correction part individually carries out the correction process on the plurality of color image data, which have been screen processed.

3. The image forming apparatus according to claim 1, wherein the correction part carries out the correction process based on a predetermined parameter, and
    the correction processing part includes:
        a parameter determination part that determines the predetermined parameter to remove defects of an image, which is formed by correcting image data having been screen processed on the basis of a characteristic of the screen process; and
        a second image processing part that corrects the screen processed image data by using the determined predetermined parameter.

4. The image forming apparatus according to claim 3,
    wherein the characteristic of the screen process indicates a periodicity of the screen process;
    a parameter of the correction process is relevant to a periodicity of the correction process; and
    the parameter determination part determines the predetermined parameter to prevent interference of the period of the screen process with the period of the correction process.

5. The image forming apparatus according to claim 3,
    wherein the parameter determination part determines the predetermined parameter on the basis of at least one of number of lines in the screen process, screen angle and reproduction density; and
    wherein the parameter of the correction process includes at least one of inserting of pixels into the screen processed image data and thinning out of pixels from the screen processed image data.

6. The image forming apparatus according to claim 3,
    wherein the parameter determination part determines the predetermined parameter so that at least one of a period of inserting of pixels into the screen processed image data and a period of thinning out of pixels from the screen processed image data is different from at least one of a period of number of lines in the screen process, a period of screen angle and a period of reproduction density.

7. The image forming apparatus according to claim 1, wherein:
    a tag representing a screen characteristic is attached to the image data; and
    the first image processing part carries out the screen process on the image data in accordance with the tag attached to the image data.

8. The image forming apparatus according to claim 3, wherein:
    the correction processing part further comprises:
        a screen characteristic detecting part that detects the characteristic of the screen process from the image data, which has been screen processed; and
        the parameter determination part determines the predetermined parameter based on the detected characteristic of the screen process.

9. The image forming apparatus according to claim 1,
    wherein the correction part carries out the correction process on the screen processed image data, on the basis of the misregistration detected by the misregistration detecting part and characteristic of the screen process.

10. The image forming apparatus according to claim 9,
    wherein the characteristic of the screen process includes at least one of number of lines, screen angle, and reproduction density.

* * * * *